Patented Jan. 10, 1933

1,893,835

UNITED STATES PATENT OFFICE

PHILIP ATTKISS, OF BROOKLYN, NEW YORK

ANTIFREEZING SOLUTION

No Drawing.    Application filed July 18, 1930. Serial No. 468,981.

This invention relates to anti-freezing solutions and the process for making the same.

It is a known fact that calcium chloride will depress the freezing point of an aqueous solution. But it is also known that a solution of calcium chloride has a corrosive action on metals. Previous attempts have been made to prevent this action on the metals by including an insoluble substance in the mixture which was assumed to coat the metals with a protective film.

The purpose of this invention is to compound an aqueous solution of calcium chloride containing chemicals which destroy the corroding powers of a simple solution of calcium chloride.

The theory upon which this invention is based is described briefly as follows:

Calcium chloride in an aqueous solution hydrolyzes and forms calcium hydroxide and hydrochloric acid. If a metal (any metal above hydrogen in the electromotive series) is present, the hydrochloric acid formed through hydrolysis of the calcium chloride attacks the metal and forms the chloride of the metal. The chloride of the metal is also hydrolyzed. But there is an excess of hydrochloric acid since the calcium hydroxide formed is not very soluble and precipitates from the solution. This excess of hydrochloric acid will form more of the chloride of the metal. This action removes some hydrochloric acid from the solution. The equilibrium is displaced so that more calcium chloride is dissociated and more hydrochloric acid is formed together with more calcium hydroxide. The action is thus a progressive one and proceeds until one or both of the ingredients (the metal or the calcium chloride) are removed. If an excess of one of the products of the dissociation (either hydrochloric acid or calcium hydroxide) could be put into the solution it would displace the equilibrium in a reverse direction and more calcium chloride would be formed. It would not be feasible to add some hydrochloric acid since that would increase the action upon the metals. It is not possible to put more calcium hydroxide into solution since calcium hydroxide is not very soluble in water. But if glycerine is added to the solution the solubility of calcium hydroxide is greatly increased. Thus by adding some glycerine, more calcium hydroxide may be added and it will go into solution. An excess of the calcium hydroxide being present will cause the reversal of the original reaction, and some calcium hydroxide will react with some hydrochloric acid to form calcium chloride. In this way the hydrochloric acid ceases to form and the action on metals is checked.

From the above explanation it is seen that the ingredients making up this anti-freeze are calcium chloride, calcium hydroxide and glycerine.

The glycerine serves a dual purpose. Besides increasing the solubility of the calcium hydroxide, its presence in an aqueous solution of calcium chloride prevents the possibility of the calcium chloride crystallizing from the solution.

This anti-freeze is best prepared by first mixing the proper amount of glycerine with a known quantity of water. Enough of the calcium hydroxide is then added to saturate the solution. The necessary amount of calcium chloride is then put into the solution. The mixture is then filtered through a sand bed. The filtrate is a clear, odorless, almost colorless liquid, ready for use. It should be diluted the proper amount to withstand the minimum temperatures encountered in the locality.

As an aid in handling, selling or storing, this solution may be boiled until reduced to about one half its original volume. Upon cooling, it will congeal to a transparent gelatinous substance. As soon as water is added, however, the substance dissolves immediately and forms a homogeneous solution.

For the preparation of this anti-freeze it has been found that the following proportions of ingredients are most desirable.

One hundred pounds of calcium chloride.

One gallon of glycerine.

One quarter of a pound of calcium hydroxide.

Sufficient water to make seventeen gallons of solution.

I claim as my invention the following:

1. A solution, to be used as an anti-freeze composed of ingredients mixed in the following proportions: 100 lbs. calcium chloride, 1 gal. glycerine, ¼ lb. calcium hydroxide, enough water to make 17 gallons of solution.

2. A solution, to be used as an anti-freeze composed of ingredients mixed in the following proportions: 100 lbs. calcium chloride, ¼ lb. calcium hydroxide, enough glycerine to make 17 gallons of solution.

Signed at Brooklyn in the county of Kings and State of New York this 8th day of July, A. D. 1930.

PHILIP ATTKISS.